United States Patent
Gray et al.

(10) Patent No.: US 11,095,608 B2
(45) Date of Patent: Aug. 17, 2021

(54) CROSS PROTOCOL ASSOCIATION FOR INTERNET ADDRESSES FOR METADATA ASSOCIATION SYSTEMS AND METHODS

(71) Applicant: Citrix Systems, Inc., Fort Lauderdale, FL (US)

(72) Inventors: Josh Thomas Gray, Washington County, OR (US); Thomas Edward Roth, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/399,879

(22) Filed: Apr. 30, 2019

(65) Prior Publication Data

US 2020/0351239 A1    Nov. 5, 2020

(51) Int. Cl.
| | |
|---|---|
| H04L 29/12 | (2006.01) |
| H04L 12/26 | (2006.01) |
| H04L 12/24 | (2006.01) |
| G06F 16/29 | (2019.01) |

(52) U.S. Cl.
CPC .......... *H04L 61/251* (2013.01); *H04L 41/046* (2013.01); *H04L 43/18* (2013.01); *H04L 61/1511* (2013.01); *G06F 16/29* (2019.01)

(58) Field of Classification Search
CPC . H04L 61/6086; H04L 61/256; H04L 61/106; H04L 43/18; H04W 4/021; G06F 16/29
See application file for complete search history.

(56) References Cited

U.S. PATENT DOCUMENTS

| | | | | |
|---|---|---|---|---|
| 9,929,951 | B1* | 3/2018 | Dickinson | ........... H04L 61/2514 |
| 10,230,687 | B1* | 3/2019 | Duleba | ............... H04L 61/6086 |
| 10,298,601 | B2* | 5/2019 | Graham-Cumming | ...................... H04L 63/0823 |
| 2002/0150104 | A1* | 10/2002 | Hamamoto | ............. H04L 69/22 370/392 |
| 2005/0198049 | A1* | 9/2005 | Ho | ......................... H04L 41/12 |
| 2006/0077940 | A1* | 4/2006 | Ganji | .................... H04L 61/106 370/338 |
| 2008/0069137 | A1* | 3/2008 | Jimmei | ................... H04L 12/66 370/466 |
| 2009/0222895 | A1* | 9/2009 | Banga | ................... H04L 63/102 726/5 |

(Continued)

*Primary Examiner* — Joshua Joo
(74) *Attorney, Agent, or Firm* — Foley & Lardner LLP

(57) ABSTRACT

Described embodiments provide systems and methods for cross protocol association using internet addresses for metadata association. An association between IPv4 addresses and IPv6 addresses can determined and used to bridge metadata from collection context in a first protocol into usage for a second protocol. A server can monitor a plurality of handshake exchanges to generate the association between IPv4 addresses and IPv6 addresses for a device or group of devices. The handshake exchange can include an IPv4 address, an IPv6 address, or both an IPv4 address and an IPv6 address for a respective device. The handshake exchanges can include a unique identifier corresponding to the respective device. The server can use the association to generate a mapping linking a range of IPv4 addresses to a range of IPv6 addresses corresponding to the same device. The mapping can be used to associate metadata to devices within the same ranges.

20 Claims, 7 Drawing Sheets

(56) References Cited

U.S. PATENT DOCUMENTS

| | | | |
|---|---|---|---|
| 2016/0205134 A1* | 7/2016 | Smith | H04L 63/101 |
| | | | 726/23 |
| 2016/0357587 A1* | 12/2016 | Yadav | H04L 45/46 |
| 2019/0215253 A1* | 7/2019 | Yadav | H04L 41/0806 |
| 2019/0281013 A1* | 9/2019 | Bao | H04L 61/1511 |
| 2020/0021556 A1* | 1/2020 | Goelitz | G06F 9/5072 |
| 2020/0053103 A1* | 2/2020 | Rehak | H04L 63/1425 |
| 2020/0177566 A1* | 6/2020 | Naaman | H04L 9/321 |

\* cited by examiner

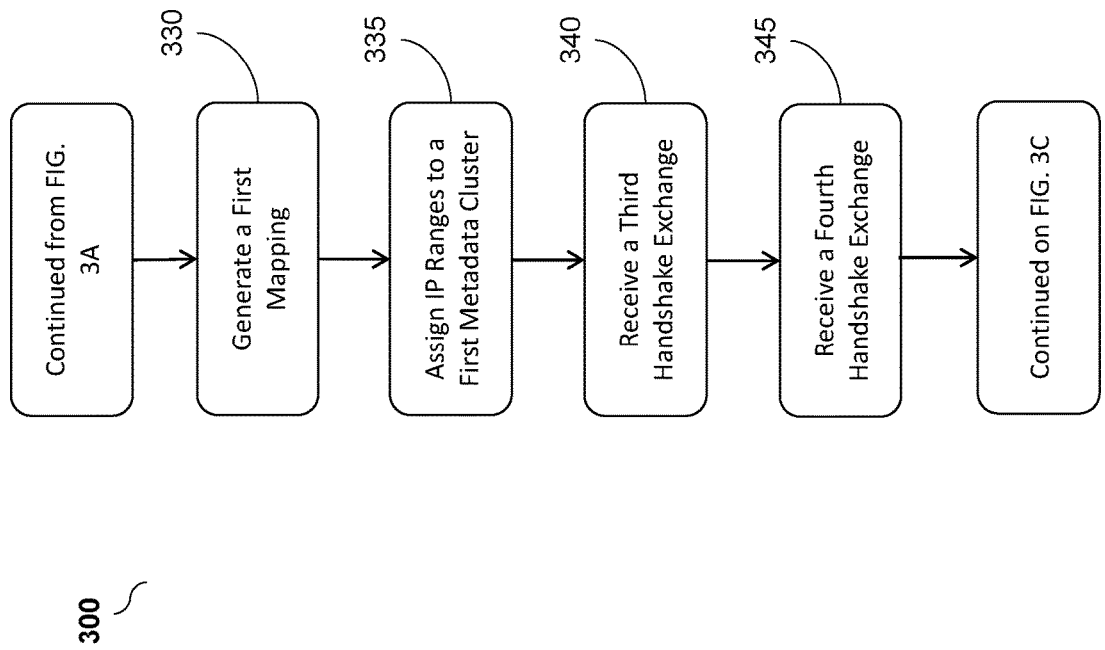

CROSS PROTOCOL ASSOCIATION FOR INTERNET ADDRESSES FOR METADATA ASSOCIATION SYSTEMS AND METHODS

BACKGROUND

In network environments, computers can be assigned a unique identifier corresponding to an internet protocol (IP) address. For example, a computer or other form of network device can be assigned an IPv4 address or an IPv6 address. As the internet transitions from using IPv4 addresses to instead using IPv6 addresses, more and more computers and other forms of network devices can be assigned an IPv6 address to uniquely identify the respective computer or network device.

SUMMARY

Systems and method for cross protocol association using internet addresses for metadata association. In embodiments, an association between an internet protocol (IP) version 4 (IPv4) address and an IP version 6 (IPv6) address can be determined for a particular device and the association can be used to bridge metadata, such as but not limited to, performance data and geographical data, from collection context in a first protocol (e.g., IPv4, IPv6) into usage for a second, different protocol (e.g., IPv4, IPv6). For example, a server (e.g., traffic management server) can monitor a plurality of handshake exchanges to generate the association between IPv4 addresses and IPv6 addresses for the device. The handshake exchange can include an IPv4 address, an IPv6 address, or both an IPv4 address and an IPv6 address for the respective device. The handshake exchanges can include a unique identifier corresponding to the respective device. The server can use the association to generate a mapping linking a range of IPv4 addresses corresponding to the device to a range of IPv6 addresses corresponding to the same device. The mapping between ranges of addresses in the IPv4 space and IPv6 space can be used to associate metadata information between devices within the same range or neighboring ranges. For example, data sets mapping IPv4 addresses and IPv6 addresses can be associated into ranges based on knowledge of address assignment structure and/or common clustering of meta-information for nearby-addresses.

In embodiments, using the mapping generated for a first device, data for a second, different device can be determined. The associated range data for a first device can be used to map and distribute meta-information with previously unrecognized IPv6 address space for a second, different device. For example, the server can associate geographical data, such as a region or country, with IPv6 address ranges no previously known, based in part on knowledge of IPv4 geographic mapping. The server, as described here, can provide a range-based mapping approach such that IPv6 addresses never before directly seen or associated with previous IPv4 addressed can be accurately associated with appropriate metadata based in part on range proximity to a generated mapping.

In at least one aspect, this disclosure is directed to a method for cross protocol association for internet addresses. The method can include receiving, by a server from a monitoring agent executing at a first device of the plurality of devices, a first handshake exchange. The first handshake exchange can include a first device identifier corresponding to the first device, and a first internet protocol (IP) address for the first device. The first IP address for the first device can correspond to a first address type. The method can include receiving, by the server, from the monitoring agent, a second handshake exchange. The second handshake exchange can include the first device identifier corresponding to the first device, and a second IP address for the first device. The second IP address for the first device can correspond to a second address type. The method can include determining, by server, an association between the first address type and the second address type based at least on a predetermined number of higher order bits common to the first IP address and the second IP address for the first device. The method can include generating, by the server, a first mapping of a first range of IP addresses of the first address type to a first range of IP addresses of the second address type based on the association between the first IP address and the second IP address for the first device. The first range of IP addresses can include the first IP address for the first device and the second range of IP addresses can include the second IP address for the first device. The method can include assigning, by the server, the first range of IP addresses of the first address type and the second range of IP addresses of the second address type to a first metadata cluster for the first device. The first metadata cluster can include geographical properties of the first device.

In some embodiments, the first address type can correspond to an internet protocol version 4 (IPv4) address and the second address type can correspond to an internet protocol version 6 (IPv6) address. The method can include monitoring, by the server through the plurality of monitoring agents, a plurality of handshake exchanges between the plurality of devices and the server. The plurality of handshake exchanges can include at least one device identifier. Each device identifier can correspond to at least one device of the plurality of devices. The method can include receiving, by the server, a third handshake exchange. The third handshake exchange can include a second device identifier corresponding to a second device of the plurality of devices and a first IP address for the second device. The first IP address for the second device can correspond to the first address type. The method can include receiving, by the server, a fourth handshake exchange. The fourth handshake exchange can include the second device identifier corresponding to the second device of the plurality of device, and a second IP address for the second device. The second IP address for the second device can correspond to the second address type. The method can include determining, by the server, an association between the first address type and the second address type using the first IP address and the second IP address for the second device.

In some embodiments, the method can include generating, by the server, a second mapping of a second range of IP addresses of the first address type to a second range of IP addresses of the second address type based on the association between the first IP address and the second IP address of the second device. The second range of IP addresses can include the first IP address for the second device and the second range of IP addresses including the second IP address for the second device. The method can include assigning, by the server, the second range of IP addresses of the first address type and the second range of IP addresses of the second address type to a second metadata cluster for the second device. The second metadata cluster can include geographical properties of the first device. The method can include receiving, by the server, a fifth handshake exchange. The fifth handshake exchange can include a third device identifier corresponding to a third device of the plurality of devices, and a first IP address for the third device. The first IP address for the third device can correspond to the first address type. The method can include determining, by the server, the third IP address is positioned between the first range of IP addresses of the first type and the second range of IP addresses of the first type. The method can include determining, by the server, a second IP address for the third device using the first mapping and the second mapping, the second IP address of the second address type.

In some embodiments, the method can include receiving, by the server, a third handshake exchange, the third handshake exchange including a second device identifier corresponding to a second device of the plurality of devices, and a first IP address for the second device. The first IP address for the second device can be within the first range of IP addresses of the first address type. The method can include determining, by the server using the first mapping and the first range of IP addresses of the first address type. The second device can correspond to the first metadata cluster for the first device. The method can include generating, by the server, metadata for the second device using the first metadata cluster. The method can include determining, by the server using the first metadata cluster for the first device, a geographical location of the second device.

In some embodiments, the method can include receiving, by the server, a third handshake exchange. The third handshake exchange can include a second device identifier corresponding to a second device of the plurality of devices, and a first IP address for the second device. The first IP address for the second device can be within the first range of IP addresses of the first address type. The method can include determining, by the server using the first mapping, a second IP address for the second device. The second IP address can be of the second address type. The method can include determining a boundary between owned address space for the first range of IP addresses of the first address type and assigned address space for the first range of IP addresses of the first address type. The owned address space can correspond to the predetermined number of higher order bits common to the first IP address and the second IP address for the first device. The method can include determining the owned address space for the first range of IP addresses of the first address type corresponds to a cluster of devices including the first device. Each device in the cluster of devices can include an IP address sharing the predetermined number of higher order bits.

In some embodiments, the method can include identifying, by the server, a fourth handshake exchange including a third device identifier corresponding to a third device of the plurality of devices and a first IP address for the third device. The method can include determining, by the server, the first IP address for the third device corresponds to the owned address space for the first range of IP addresses of the first address type. The method can include assigning, by the server, the third device to the cluster of devices with the first device.

In at least one aspect, this disclosure is directed to a system for cross protocol association for internet addresses. The system can include a server having one or more processors, coupled to a memory. The server can be configured to receive, from a monitoring agent executing at a first device of the plurality of devices, a first handshake exchange. The first handshake exchange can include a first device identifier corresponding to the first device, and a first internet protocol (IP) address for the first device. The first IP address for the first device can correspond to a first address type. The server can be configured to receive, from the monitoring agent, a second handshake exchange. The second handshake exchange can include the first device identifier corresponding to the first device, and a second IP address for the first device. The second IP address for the first device can correspond to a second address type. The server can be configured to determine, an association between the first address type and the second address type based at least on a predetermined number of higher order bits common to the first IP address and the second IP address for the first device. The server can be configured to generate a first mapping of a first range of IP addresses of the first address type to a first range of IP addresses of the second address type based on the association between the first IP address and the second IP address for the first device. The first range of IP addresses can include the first IP address for the first device and the second range of IP addresses can include the second IP address for the first device. The server can be configured to assign the first range of IP addresses of the first address type and the second range of IP addresses of the second address type to a first metadata cluster for the first device. The first metadata cluster can include geographical properties of the first device.

In some embodiments, the server can be configured to receive a third handshake exchange, the third handshake exchange including a second device identifier corresponding to a second device of the plurality of devices, and a first IP address for the second device. The first IP address for the second device can correspond to the first address type. The server can be configured to receive a fourth handshake exchange. The fourth handshake exchange can include the second device identifier corresponding to the second device of the plurality of devices, and a second IP address for the second device. The second IP address for the second device can correspond to the second address type. The server can be configured to determine an association between the first address type and the second address type using the first IP address and the second IP address for the second device. The server can be configured to generate a second mapping linking a second range of IP addresses of the first address type to a second range of IP addresses of the second address type based on the association between the first IP address and the second IP address of the second device. The second range of IP addresses can include the first IP address for the second device and the second range of IP addresses can include the second IP address for the second device. The server can be configured to assign the second range of IP addresses of the first address type and the second range of IP addresses of the second address type to a second metadata cluster for the second device. The second metadata cluster can include geographical properties of the first device.

In some embodiments, the server can be configured to receive a fifth handshake exchange. The fifth handshake exchange can include a third device identifier corresponding to a third device of the plurality of devices, and a first IP address for the third device. The first IP address for the third device can correspond to the first address type. The server can be configured to determine the third IP address is positioned between the first range of IP addresses of the first type and the second range of IP addresses of the first type. The server can be configured to determine a second IP address for the third device using the first mapping and the second mapping. The second IP address can be of the second address type. In embodiments, the server can be configured to receive a third handshake exchange. The third handshake exchange can include a second device identifier corresponding to a second device of the plurality of devices, and a first IP address for the second device. The first IP address for the second device can be within the first range of IP addresses of the first address type. The server can be configured to determine, using the first mapping and the first range of IP addresses of the first address type. The second device can correspond to the first metadata cluster for the first device. The server can be configured to generate metadata for the second device using the first metadata cluster.

In some embodiments, the server can be configured to determine, using the first metadata cluster for the first device, a geographical location of the second device. The server can be configured to receive a third handshake exchange, the third handshake exchange including a second device identifier corresponding to a second device of the plurality of devices, and a first IP address for the second device. The first IP address for the second device can be within the first range of IP addresses of the first address type. The server can be configured to determine, using the first mapping, a second IP address for the second device. The second IP address can be of the second address type. In embodiments, the server can be configured to determine a boundary between owned address space for the first range of IP addresses of the first address type and assigned address space for the first range of IP addresses of the first address type. The owned address space can correspond to the predetermined number of higher order bits common to the first IP address and the second IP address for the first device. The server can be configured to determine the owned address space for the first range of IP addresses of the first address type corresponds to a cluster of devices including the first device. Each device in the cluster of devices can include an IP address sharing the predetermined number of higher order bits.

In some embodiments, the server can be configured to identify a fourth handshake exchange including a third device identifier corresponding to a third device of the plurality of devices and a first IP address for the third device. The server can be configured to determine the first IP address for the third device corresponds to the assigned owned address space for the first range of IP addresses of the first address type. The server can be configured to assign the third device to the cluster of devices with the first device.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIGS. 3A-3C are a flow diagram of a method for cross protocol association using internet addresses for metadata association.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes methods and systems for cross protocol association using internet addresses for metadata association.

A. Computing Environment

Prior to discussing the specifics of embodiments of the systems and methods of < >, it may be helpful to discuss the computing environments in which such embodiments may be deployed.

Figure 1:
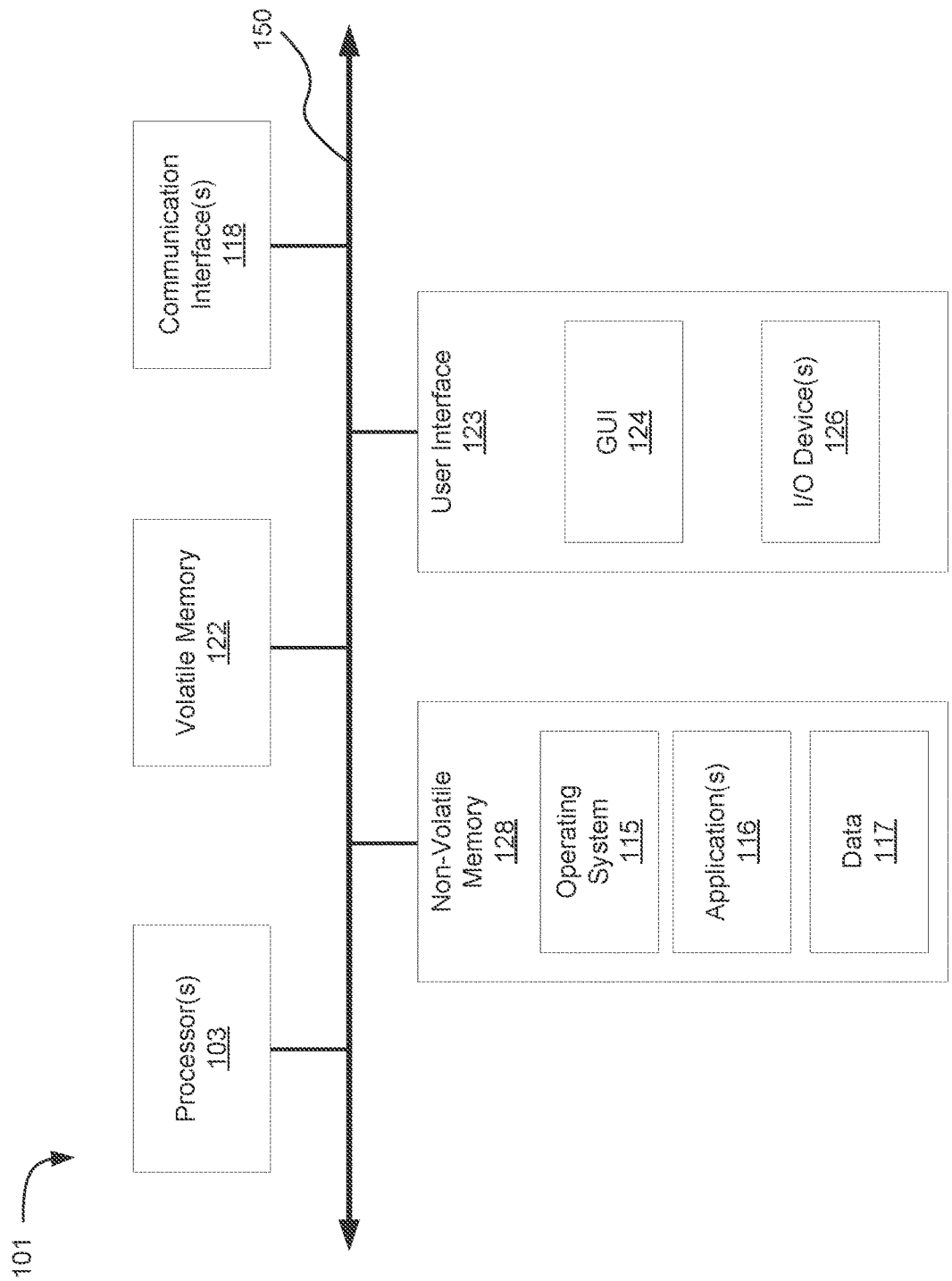
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Cross Protocol Association Using Internet Protocol Addresses for Metadata Association Systems and method for cross protocol association using internet protocol (IP) addresses for metadata association are provided herein. A server (e.g., traffic management server) can monitor a plurality of handshake exchanges to determine an association between IP addresses of a first type (e.g., IP version 4 (IPv4)) and IP addresses of a second type (e.g., IP version 6 (IPv6)). The server can use the association to generate mappings between ranges of IP addresses of the first type and ranges of IP addresses of the second type. The range association between the different IP address types can be used determine IP address data and/or metadata for devices not previously known. For example, the server can use the range association to determine IPv6 address for a device and/or a metadata for the device, such as but not limited to, geographical data.

In embodiments, IP addresses are migrating from IP version 4 (IPv4) to IP version 6 (IPv6) due to the limitation of available address space in IPv4. Thus, substantial amounts of metadata is available and can be collected and indexed using an IP address. In some embodiments, metadata such as a geographic estimation of country, region, state and city where a particular device possessing a particular public IP address is located can be determined. In some embodiments, point to point internet performance metrics between different or autonomous networks on the internet can be collected and modeled by a server. Thus, as devices add support for IPv6, a significant amount of available metadata can be indexed based in part on the larger and newer public address space available using IPv6 as compared to IPv4. In some embodiments, the metadata can be applicable between the IPv4 addresses and IPv6 addresses as device often possess both at least one IPv4 address and at least one IPv6 address in a shared instance.

The servers as described herein can generate mappings linking likely "same devices" between IPv4 address space and IPv6 address space. The server can leverage the mappings and metadata collected or available from the IPv4 address space for embodiments where only an IPv6 address may be provided. For example, the server, can receive a connection from an IPv6 address for a device and associate geographical properties such as, but not limited to, a country, a region, a state, and/or a city of the respective device based in part on a relationship with a IPv4 address using the generated mappings between the IPv4 address space and the IPv6 address space.

Figure 2A:
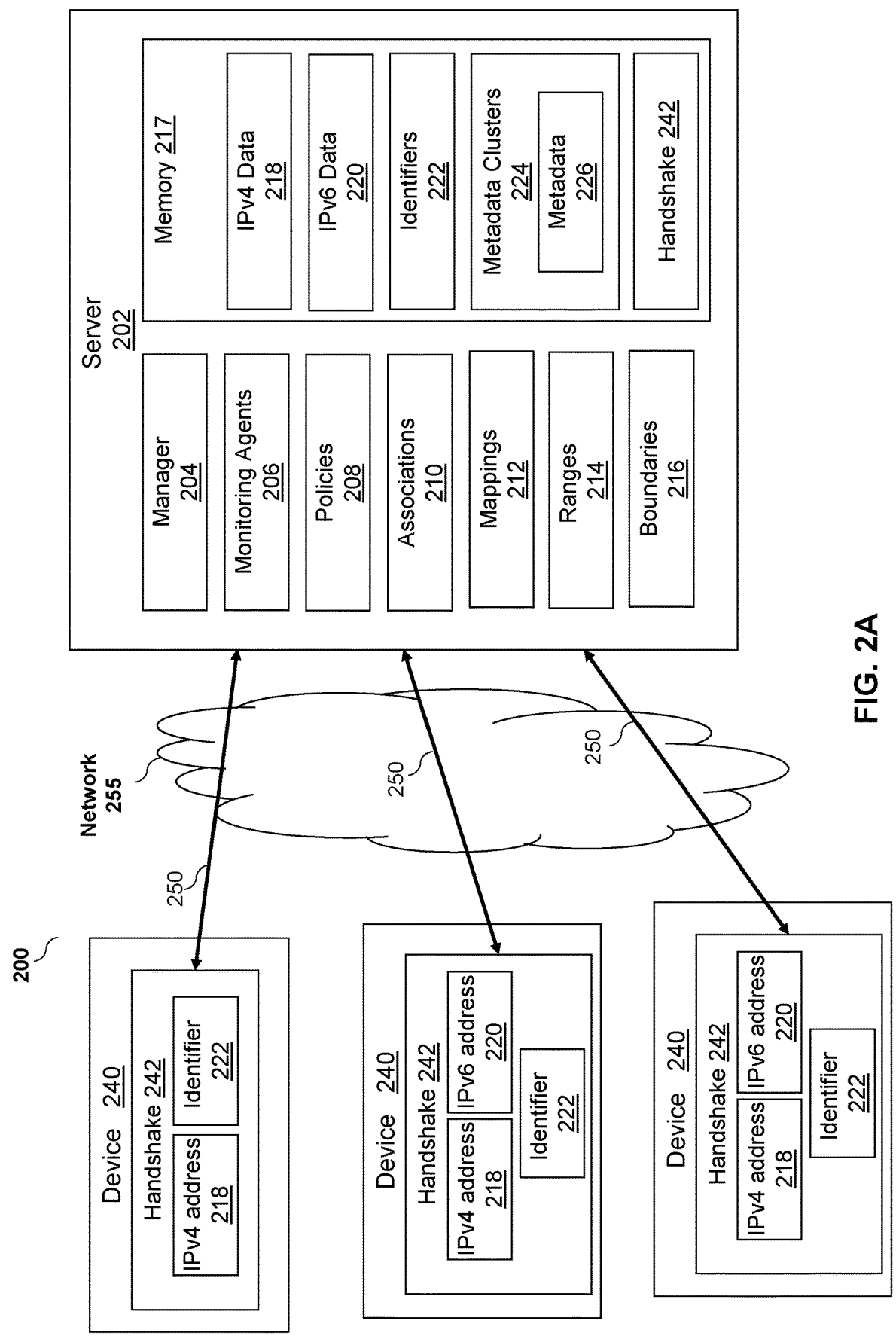
FIG. 2A is a block diagram of a system for cross protocol association using internet addresses for metadata association.

Referring to FIG. 2A, depicted is a block diagram of one embodiment of an environment 200 having a plurality of devices 240 accessing or otherwise interacting with different devices 240, servers 202, applications and/or datacenters through a network 255. The environment 200 can include a server 202 to monitor and manage traffic from and/or the plurality of devices 240. For example, in some embodiments, the server 202 can be a traffic management server for the environment 200 to collect information (e.g., real-time information) corresponding to the plurality of devices and provide performance monitoring for the environment 200. In embodiments, the server 202 can monitor handshake exchanges 242 initiated by or involving one or more of devices 240 of the plurality of devices 240 to collect properties of the devices 240 such as, but not limited to, IPv4 address information and IPv6 address information.

The device 240 can include a client device, such as, but not limited to a computing device or a mobile device. The device 240 can include or correspond to an instance of any client device, mobile device or computer device described herein. For example, the device 240 can be the same as or substantially similar to computer 101 of FIG. 1. The device 240 can include an edge device, such as but not limited to, a router, routing switching device, access device and/or multiplexer device. The device 240 can couple with the server 202 through network 255.

At least one device 240 can generate a handshake exchange 242 to identify the respective device 240 to the server 202 or to interact with or access a different device 240, server or an endpoint of the environment 200. At least one device 240 can generate a handshake exchange 242 to establish a protocol for communication between the respective device 240 and the server 202, a different device 240, server or an endpoint of the environment 200.

The handshake exchange 242 can include a negotiation between at least one device 240 and the server 202, a different device 240, server or an endpoint of the environment 200. The handshake exchange 242 can include exchange of information to establish a protocol for a connection 250 (e.g., session, communication link) at the start or before full communication begins. For example, the handshake exchange 242 can include a multi-stage sequence (e.g., two-stage sequence) using data such as, but not limited to, a device identifier 222, an IP address of a first type 218 (e.g., IPv4 address), an IP address of a second type 220 (e.g., IPv6 address), and/or one or more host names (e.g., domain name system (DNS) host names), such that the server 202 can identify the device 240 initiating the handshake exchange 242. In some embodiments, a monitoring agent 206 executing at the device 240 can initiate the handshake exchange 242 and communicate with the server 202 to identify the device 240. The device identifier 222 can correspond to a unique identifier for the respective device 240 initiating or transmitting the handshake exchange 242. In some embodiments, the device identifier 222 can include a globally unique identifier (e.g., GUID) or a session identifier corresponding to a connection 250 between the device 240 and the server 202.

The server 202 can include a processor 204. The processor 204 can include non-volatile memory that stores computer instructions and an operating system. For example, the computer instructions can be executed by the processor 204 out of volatile memory to perform all or part of the method 300. The processor 204 can include or execute policies or rules for the server 202. The processor 204 can include a database and be configured to generate and/or store authentication credentials for one or more devices 240. The processor 204 can be configured to receive and store data from one or more handshake exchanges 242. For example, the processor 204 can be configured to receive and store a device identifier 222, an IP address of a first type 218 (e.g., IPv4 address), an IP address of a second type 220 (e.g., IPv6 address), and/or one or more host names (e.g., domain name system (DNS) host names) from a handshake exchange 242 and corresponding to one or more devices 240. The processor 204 can store the data from one or more handshake exchanges 242 in a memory 217 coupled with the processor 204. In some embodiments, the processor 204 can be configured to provide enforcement support for connections 250 between the server 202 and one or more devices 240.

The memory 217 can include or correspond to a database. For example, the server 202 can include the memory 217 to store device data and device properties. The memory 217 can include IP address data for IP addresses of a first type 218. For example, the memory 217 can include IPv4 data and IPv4 addresses for one or more devices 240. In some embodiments, the memory 217 can include IP address data for IP addresses of a second type 220. For example, the memory 217 can include IPv6 data and IPv6 addresses for one or more devices 240. The memory 217 can include device identifiers 222 corresponding to or associated with one or more devices 240. The memory 217 can include metadata clusters 224 having metadata 226 corresponding to one or more devices 240. For example, the metadata clusters 224 can correspond to or be associated with a single device 240, a group of devices 240, a cluster of devices 240, or an organization (e.g., company, office) having one or more devices 240. Each metadata cluster 224 can include metadata 226 from or corresponding to the one or more devices 240 associated with the respective metadata cluster 224. The metadata 226 can include, but not limited to, geographical properties and/or performance properties of one or more devices 240. The memory 217 can include handshake exchange data 242 corresponding to one or more handshake exchanges 242. In some embodiments, the handshake data 242 can include a device identifier 222, an IP address of a first type 218 (e.g., IPv4 address), an IP address of a second type 220 (e.g., IPv6 address), and/or one or more host names (e.g., domain name system (DNS) host names) corresponding to at least one handshake exchange 242.

The memory 217 can be implemented using hardware or a combination of software and hardware. For example, each component of the memory 217 can include logical circuitry (e.g., a central processing unit or CPU) that responses to and processes instructions fetched from a memory unit or database. Each component of the memory 217 can include or use a microprocessor or a multi-core processor. A multi-core processor can include two or more processing units on a single computing component. Each component of the memory 217 can be based on any of these processors, or any other processor capable of operating as described herein. Each processor can utilize instruction level parallelism, thread level parallelism, different levels of cache, etc. For example, the memory 217 can include at least one logic device such as a computing device or server having at least one processor to communicate via a network 255. The components and elements of the memory 217 can be separate components, a single component, or a part of server 202. For example, the memory 217 can include combinations of hardware and software, such as one or more processors configured to initiate stop commands, initiate motion commands, and transmit or receive timing data, for example. The memory 217 can include a structured set of data stored for the server 202. The data stored in the memory 217 can be collected by the server 202 and stored in the memory 217. The server 202 can store and retrieve data from the memory 217. The memory 217 can include a random access memory (RAM) or other dynamic storage device, coupled with the processor 204 for storing information, and instructions to be executed by the server 202. The memory 217 can include at least one read only memory (ROM) or other static storage device coupled with the processor 204 for storing static information and instructions for the server 202. The memory 217 can include a storage device, such as a solid state device, magnetic disk or optical disk, coupled with the processor 204 to persistently store information and instructions.

The server 202 can provide or inject at least one monitoring agent 206 at one or more devices 240 of the plurality of devices 240. The monitoring agent 206 can be executing at the first device 240, for example, within a browser of the first device 240. The monitoring agent 206 can collect the data from the first handshake exchange 242, such as, but not limited to, the first device identifier 222 and/or the first IP address 218 for the first device 240. The monitoring agent 206 can transmit the data from the first handshake exchange 242 to the server 202. The monitoring agent 206 can include a script, module or agent having a set of instructions, software or code, that when executed at the respective device 240 can collect and transmit data corresponding to the device 240 to the server 202. For example, the monitoring agent 206 can run or execute a device 240 such that connections 250 initiated by the respective device 240 can be represented by an IP address (e.g., public IP address) corresponding to the device 240 executing the monitoring agent 206. In some embodiments, the monitoring agents 206 can execute at the device 240 and within a browser executing on the device 240 to monitor and collection data corresponding to connections 250 initiated by or including the respective device 240.

The server 202 can generate an association 210 between IP addresses for devices 240. For example, the associations 210 can correspond to a relationship between different IP addresses corresponding to the same device 240, group of devices 240, or cluster of devices 240. The association 210 can include a relationship between IP addresses of different types (e.g., IPv4 address, IPv6 address) corresponding to the same device 240, group of devices 240, or cluster of devices 240. In embodiments, the associations 210 can include a relationship between at least one IPv4 address 218 for a device 240 and at least one IPv6 address 220 for the same device 240. In some embodiments, the server 202 can generate associations 210 corresponding to a relationship between at least one public IPv4 address 218 for a device 240 and at least one public IPv6 address 220 for the same device 240 using a device identifier 222 included within a handshake exchange 242.

The server 202 can generate mappings 212. In embodiments, the mappings 212 can include distributed data sets associating multiple IPv4 addresses 218 with one or more IPv6 addresses 220. For example, the mappings 212 can include distributed data sets associating IPv4 addresses for a device 240 (or organization, group of devices 240, cluster of devices 240) and IPv6 addresses for the same device 240 (or same organization, same group of devices 240, same cluster of devices 240). The mappings 212 can include ranges 214 of IP addresses. For example, a mapping 212 can include a first range 214 of address of a first type 218 and a first range 214 of IP addresses of a second type 220 (e.g., IPv6 addresses). Each range 214 can include two or more IPv4 addresses or two or more IPv6 addresses. Thus, the server 202 can generate mappings 212 associating or linking ranges 214 of IP addresses of different types of addresses with each other that correspond to the same device 240, group of devices 240, and/or cluster of devices 240. In some embodiments, the mappings 212 can associate known pairs or ranges 214 of public IPv4 addresses and pairs or ranges of IPv6 addresses. T The connections 250 may include, but not limited to, an application session, an execution session, a desktop session, a hosted desktop session, a terminal services session, a browser session, a remote desktop session, a URL session and a remote application session. The connections 250 may include encrypted and/or secure sessions established between a device 240 and the server 202. For example, a connection 250 may include an encrypted session and/or a secure session established between a device 240 and the server 202. The encrypted connection 250 can include an encrypted file, encrypted data or traffic transmitted between a device 240 and the server 202.

The server 202 can include policies 208 or set of instructions for balancing load, bandwidth data, usage data and/or traffic routing data within the environment 200. The resources can include, but not limited to, central processing unit (CPU) execution times, CPU duration times (e.g., maximum CPU durations, minimum CPU durations), memory allocated, memory usage (e.g., maximum memory consumption, minimum memory consumption), and/or performance data. The applications can include routing applications and/or load balancing applications executing within the environment 200. For example, the applications can include applications for, but not limited to, static routing, failover scenarios, round robin techniques, optimal round trip time techniques, and/or throughput techniques.

Network 255 may be a public network, such as a wide area network (WAN) or the Internet. In some embodiments, network 255 may be a private network such as a local area network (LAN) or a company Intranet. Network 255 may be a public network, such as a wide area network (WAN) or the Internet. Network 255 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, devices 240 and server 202 may be on the same network 255. In some embodiments, devices 240 and server 202 may be different networks 255. The network 255 can include a virtual private network (VPN). The VPN can include one or more encrypted connections 250 from a device 240 to the server 202 over network 255 (e.g., internet, corporate network, private network).

Each of the above-mentioned elements or entities is implemented in hardware, or a combination of hardware and software, in one or more embodiments. Each component of the server 202 may be implemented using hardware or a combination of hardware or software detailed above in connection with FIG. 1. For instance, each of these elements or entities can include any application, program, library, script, task, service, process or any type and form of executable instructions executing on hardware of a client device (e.g., the device 240). The hardware includes circuitry such as one or more processors in one or more embodiments.

Figure 2B:
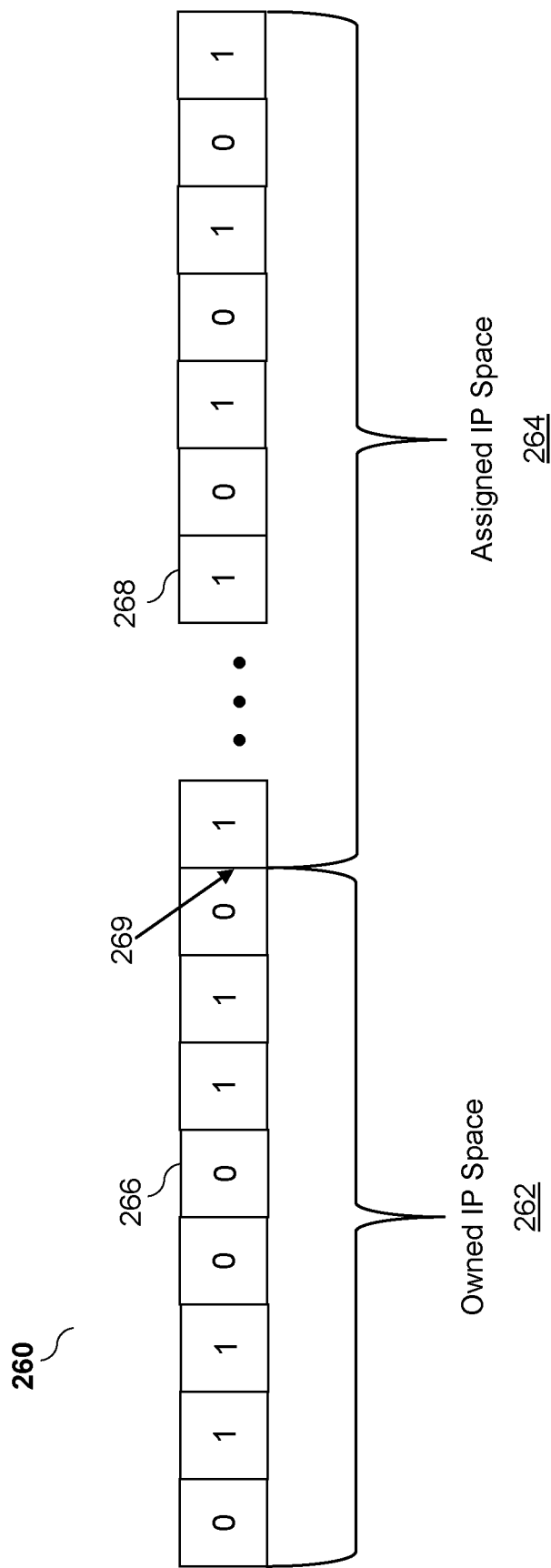
FIG. 2B is a diagram of an address space having an owned IP address space portion and an assigned IP address space portion.

Referring now to FIG. 2B, depicted is an address diagram 260 showing owned IP address space 262 and assigned IP address space 264 for IP addresses allocated to a device 240, group of devices 240, and/or cluster of devices 240. For example, each device 240 can be allocated an IP address, a plurality of IP addresses or address blocks. Each address can include a plurality of bits 266. The addresses can correspond to a numerical bit vector. An IPv4 address can include a 32-bit vector and an IPv6 address can include a 128-bit vector. The IP addresses can be allocated hierarchically according to bit significance. For example, a device 240 (e.g., organization) can be allocated a space associated with a predetermined number of high-order bits 266 corresponding to the owned IP space 262 for the device 240. The respective device 240 can have control over allocating the low-order bits 268 of the IP addresses within an organization or cluster of devices 240 of the respective device 240. The low-order bits 268 can correspond to the assigned IP space 264 for the device 240.

Thus, a device 240 (e.g., organization) can be allocated IP addresses having both an owned IP space 262 portion and an assigned IP space 264 portion. A boundary 269 can correspond to a border between the owned IP space 262 portion and the assigned IP space 264 portion for an IP address. For example, a central, administrator or main device 240 of an organization can control how it allocates the low order bits 268 to a device 240 or devices 240 of the same organization such that each of the devices 240 of the same organization can share the predetermined number of high order bits 266 corresponding to the owned IP space 262. For example, devices 240 of the same organization can have the same, matching or common high order bits 266 corresponding to the owned IP space 262. In embodiments, the high-order bits 266 can be used to determine associations 210 and/or determine devices 240 that are in the same organization or cluster. In embodiments, the central, administrator or main device 240 of an organization can control how it allocates the low order bits 268 to a device 240 or devices 240 of the same organization such that each of the devices 240 of the same organization can differ with respect to their low order bits 268 corresponding to the assigned IP space 264. The owned IP space 262 and the assigned IP space 264 can include multiple ranges 214 of IP addresses and multiple levels of ownership. However, devices 240 of the same or common organization can share the same owned IP space 262 properties and the assigned IP space 264 can differ from a first device 240 of an organization to a second device 240 of the same organization.

Figure 2C:
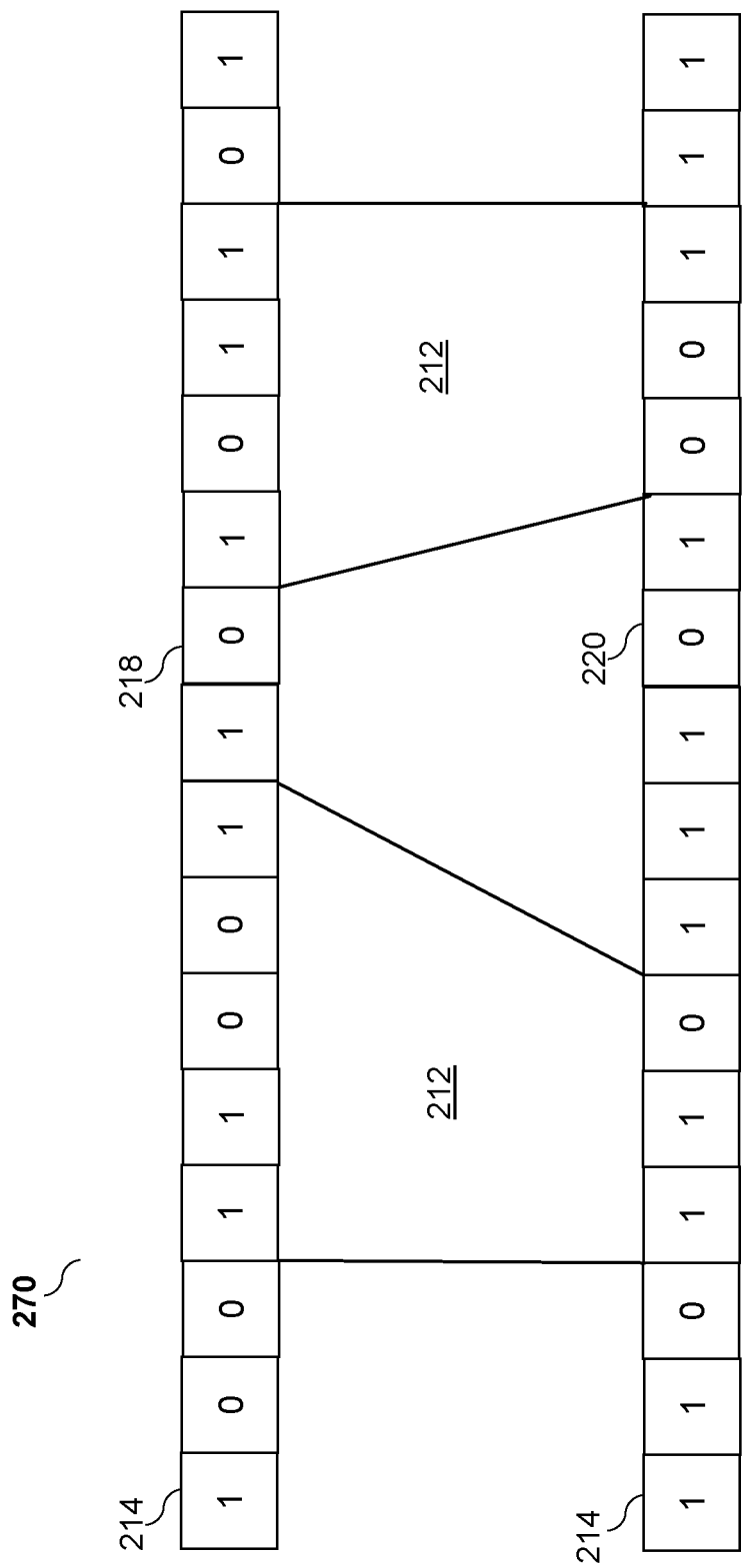
FIG. 2C is a diagram of multiple mappings associating a range of IPv4 addresses with a range of IPv6 addresses.

Referring now to FIG. 2C, depicted is a mapping diagram 270 showing a first mapping 212 and a second mapping 212. The first mapping 212 includes a first range 214 of IP addresses of a first type 218 mapped to a first range 214 of IP addresses of a second type 220. In embodiments, the first mapping 212 can include a first range 214 of IPv4 address 218 corresponding to a device 240 (or group of devices, organization) mapped and associated with a first range 214 of IPv6 addresses 220 corresponding to the same device 240 (or group of devices, organization). The second mapping 212 includes a second range 214 of IP addresses of a first type 218 mapped to a second range 214 of IP addresses of a second type 220. In embodiments, the second mapping 212 can include a second range 214 of IPv4 address 218 corresponding to a device 240 (or group of devices, organization) mapped and associated with a second range 214 of IPv6 addresses 220 corresponding to the same device 240 (or group of devices, organization).

The server 202 can generate the mappings 212 using ranges 214 of IP addresses. Each mapping 212 can correspond to a range of IP addresses assigned to or associated with a device 240, group of devices 240, cluster of devices 240 or an organization made up of a group of devices 240. The mappings 212 can be used to identify IPv6 addresses 220 for one or more devices 240 using a known or determined IPv4 address 218. The mappings 212 can be used to identify IPv4 addresses 218 for one or more devices 240 using a known or determined IPv6 address 220. For example, the server 202 can use the mappings 212 such that IPv6 addresses never seen before, used before in a handshake exchange 242 or not previously associated with known IPv4 addresses can be accurately associated with appropriate metadata based on a range proximity with a range 214 the respective IPv6 address falls within. The server 202 can use the mappings 212 such that IPv4 addresses never seen before, used before in a handshake exchange 242 or not previously associated with known IPv6 addresses can be accurately associated with appropriate metadata based on a range proximity with a range 214 the respective IPv4 address falls within.

In embodiments, the server 202 can dynamically adjust the ranges 214 used to generate the mappings 212. For example, responsive to one or more handshake exchanges 242, the server 202 can modify a size (e.g., number of IP addresses, properties of the high-order bits 266) of a range 214 used to generate a mapping 212. The handshake exchanges 242 can include new data or metadata 226 corresponding to a first device 240 and a second device 240 that were previously included within the same mapping 212. The new data from the handshake exchange 242 can indicate that the generated mapping 212 including the first and second devices 240 are from different organizations or that otherwise should not be grouped together in a common mapping 212. The server 202 can update or modify the boundaries 269 for an owned IP space 262 and assigned IP space 264 for the respective devices 240 as previously determined by the server 202. The updated boundaries 269 can correspond to new ranges 214 for the respective devices 240. In embodiments, the updated boundaries 269 can correspond to a change in the number of predetermined high-order bits 266 for a particular association 210, mapping 212 and/or range 214. For example, the server 202 can generate a new range 214 of IP address of the first type 218 for the first device 240 and/or the server 202 can generate a new range 214 of IP address of the second type 220 for the first device 240. The server 202 can generate a new range 214 of IP address of the first type 218 for the second device 240 and/or the server 202 can generate a new range 214 of IP address of the second type 220 for the second device 240. The server 202 can use the new ranges 214 of IP addresses to modify the mappings 212. For example, the server can modify the first mapping 212 for the first device 240 and generate a new second mapping 212 for the second device 240. In some embodiments, the server can modify the first mapping 212 for the first device 240 and modify the second mapping 212 for the second device 240.

In FIG. 2C, two mappings 212 are provided. The server 202 can generate a single mapping 212, two mappings 212, or more than two mappings 212. The number of mappings 212 generated can correspond to the data received and/or collected from handshake exchanges 242. For example, as the server 202 receives new data and metadata 226 from handshake exchanges 242, the server 202 can update existing mappings 212 and/or generate new mappings 212 to further refine the accuracy the generated mappings 212. In embodiments, the server 202 can continually update and modify the mappings 212 responsive to one or more handshake exchanges 242. The server 202 can dynamically manage segmentation of the mappings 212 to track the layers of associated ranges 214 forming the respective mappings 212 and make adjustments to the number of bits in the address hierarchical metadata 226 based in part on the handshake exchange 242 and thus, the overall content of the data set used to form the respective mapping 212.

In embodiments, the server 202 can execute a mapping algorithm to generate the mappings 212 and update existing mappings 212. For example, as new data sets are generated responsive to handshake exchanges 242 and evaluated, new or multiple data points corresponding to boundaries 269 for the ranges 214 can be generated by the server 202. In some embodiments, two or more IPv6 addresses 220 can be associated with or mapped with the same IPv4 address 218 through a mapping 212. Due to the described hierarchical nature of address bits, the two IPv6 addresses 220 can share or have some predetermined number of high-order bits 266 in common with each other and diverge or differ at some point in the address space. The server 202 can determine that the divergence point corresponds to a boundary 269 for the mapping 212 or mapped address space. For example, the divergence point can correspond to a boundary 269 between the owned IP space 262 and the assigned IP space 264 for a device 240 or group of devices 240 associated with the mapping 212. The server 202 can use the boundary 269 to determine that other addresses from other devices 240 sharing the same predetermined number of high-order bits 266 but differing after the identified boundary 269, thus differing with respect to low-order bits 268, can be included within the same mapping 212 to the same IPv4 address 218. For example, the server 202 can compare high-order bits 266 from different IPv4 address 218 and/or IPv6 addresses 220 to determine with the addresses should be included within the same mapping 212. In embodiments, if the predetermined number of high-order bits 266 from different IPv4 address 218 and/or IPv6 addresses 220 match, the server 202 can determine the respective addresses can be included within the same mapping 212 and update the respective mapping 212 to include the addresses. In embodiments, as multiple boundaries 269 are determined by the server 202, the server 202 can continually and dynamically update the boundary 269 to modify the size of a respective mapping 212.

In some embodiments, the server 202 can modify the mappings 212 such that a first mapping 212 can extend from a nearest common boundary or border with a second, different mapping 212. The server 202 can modify the mappings 212 such that a first mapping 212 can extend from a nearest common boundary or border with a second, different mapping 212 to a nearest common boundary or border with a third, different mapping 212. In some embodiments, the server 202 can modify the ranges 214 such that a first range 214 can extend to a nearest common boundary or border with a second, different range 214. The server 202 can modify the ranges 214 such that the first range 214 can extend from a nearest common boundary or border with a second, different range 214 to a nearest common boundary or border with a third, different range 214. In embodiments, the server 202 can assign or allocate undetermined space between different mappings 212 or ranges 214 to a higher mapping 212 assignment or a higher range 214 assignment such that the undetermined space and corresponding addresses are mapped 212 to particular group of addresses until more data for the undetermined space is received and the mappings 212 or ranges 214 are updated by the server 202. In embodiments, the server 202 can assign or allocate undetermined space between different mappings 212 or ranges 214 to a lower mapping 212 assignment or lower range 214 assignment such that the undetermined space and corresponding addresses are mapped 212 to particular group of addresses until more data for the undetermined space is received and the mappings 212 or ranges 214 are updated by the server 202.

Figure 3A:
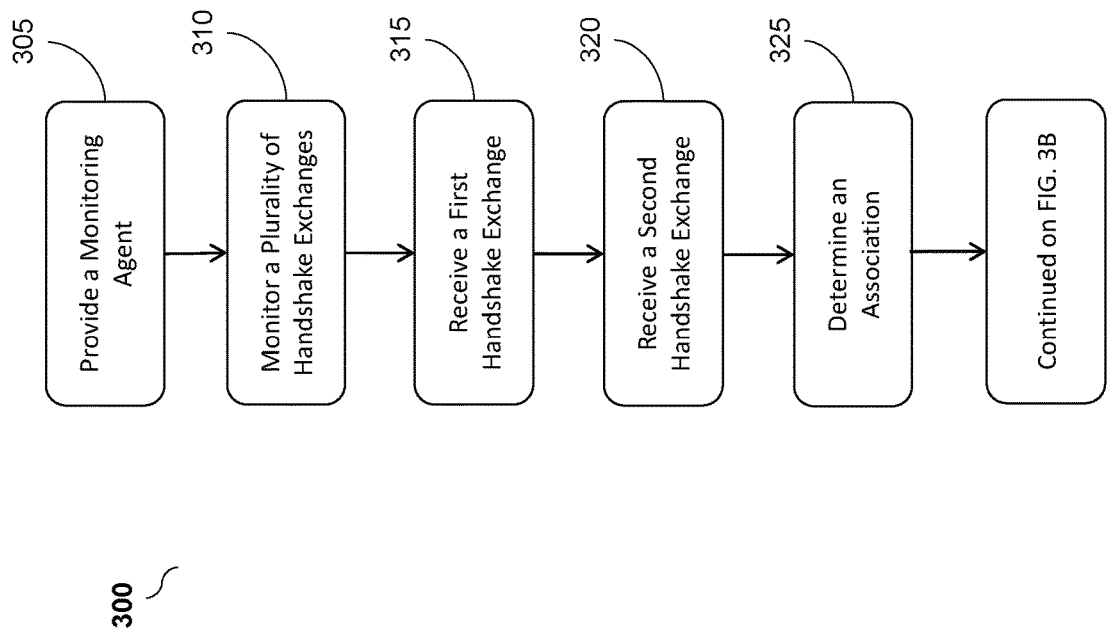
Figure 3C:
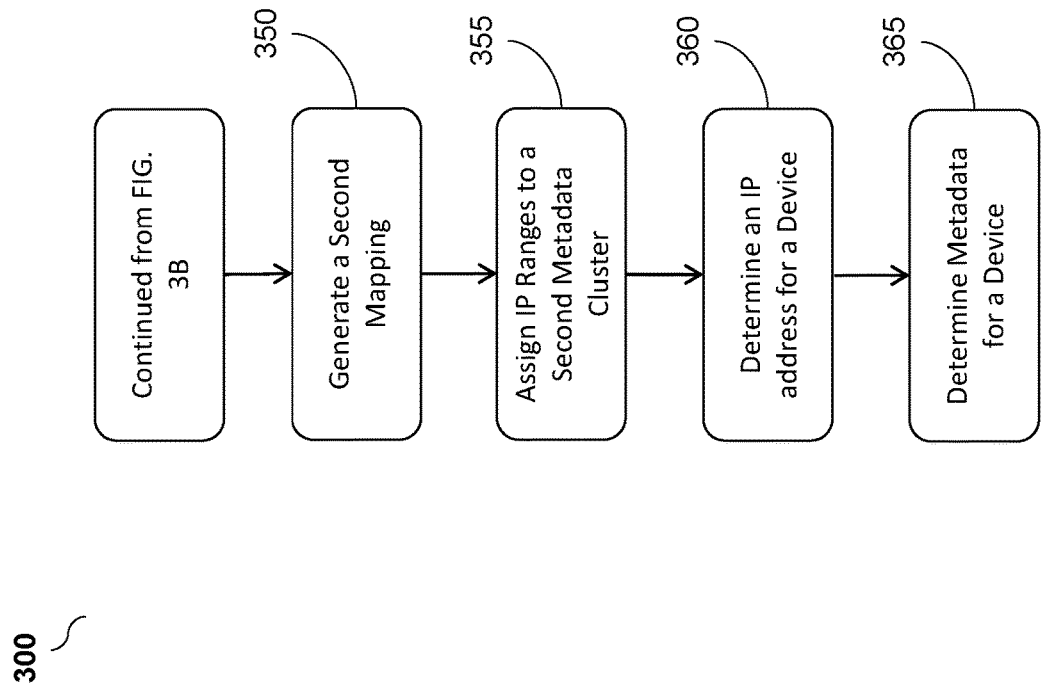

Referring now to FIGS. 3A-3C, depicted is a flow diagram of one embodiment of a method 300 for cross protocol association using internet protocol (IP) addresses for metadata association. The functionalities of the method 300 may be implemented using, or performed by, the components detailed herein in connection with FIGS. 1-2. In brief overview, providing a monitoring agent (305). Monitoring a plurality of handshake exchanges (310). Receiving a first handshake exchange (315). Receiving a second handshake exchange (320). Determining an association (325). Generating a first mapping (330). Assigning IP ranges to a first metadata cluster (335). Receiving a third handshake exchange (340). Receiving a fourth handshake exchange (345). Generating a second mapping (350). Assigning IP ranges to a second metadata cluster (355). Determining an IP address for a device (360). Determining metadata for a device (365).

Referring now to operation (305), and in some embodiments, a monitoring agent 206 can be provided to or injected at a plurality of devices 240. A server 202 can be provided within a network 255 to provide traffic management for a plurality of devices 240 accessing various endpoints, servers, or other devices 240 within the network 255. The server 202 can receive and/or monitor connections 250 established by the devices 240 to the server 202 or to various endpoints, servers, or other devices within the network 255. For example, the server 202 can monitor handshake exchanges 242 initiated by or including one or more of the devices 240 to the server 202 or to various endpoints, servers, or other devices within the network 255.

In some embodiments, to monitor the connections initiated by, established by, or including the devices 240, a plurality of monitoring agents 206 can be injected or provided to a plurality of devices 240. The server 202 can inject at least one monitoring agent 206 into a browser of each device 240 of the plurality of devices 240. The monitoring agents 206 can include a module or agent having a set of instructions, software or code, that when executed at the respective device 240 can collect data corresponding to the device 240 and transmit the data to the server 202. For example, the monitoring agent 206 can run or execute a device 240 such that connections 250 initiated by the respective device 240 can be represented by an IP address (e.g., public IP address) corresponding to the device 240 executing the monitoring agent 206. In some embodiments, the monitoring agents 206 can execute at the device 240 and within a browser executing on the device to monitor and collection data corresponding to connections 250 initiated by or including the respective device 240.

Referring now to operation (310), and in some embodiments, a plurality of handshake exchanges 242 can be monitored. The server 202 can monitor handshake exchanges 242 between different devices 240, between a device 240 and the server 202, and/or between a device 240 and other servers or endpoints within the network 255. In some embodiments, the server 202 can collect or extract data corresponding to a handshake exchange 242. For example, the server 202 can collect or extract data such as, but not limited to, an IP address of a first type (e.g., IPv4 address), an IP address of a second type (e.g., IPv6 address), a host name, and/or a device identifier 222.

The handshake exchanges 242 can be monitored by monitoring agents 206. For example, the monitoring agents 206 can detect when a device 240 initiates a handshake exchange 242 or receives a request for a handshake exchange 242 with the server 202, an endpoint, a server, and/or other devices 240 within the network 255. Responsive to the detection, the monitoring agent 206 can initiate collecting or extracting data corresponding to the handshake exchange 242. The monitoring agent 206 can collect or extract data such as, but not limited to, an IP address of a first type (e.g., IPv4 address), an IP address of a second type (e.g., IPv6 address), a host name, and/or a device identifier 222. In some embodiments, the monitoring agents 206 can run at a device 240 and collect performance data or performance metrics corresponding to the respective device 240. The monitoring agent 206 can transmit the collected data to the server 202 for analysis and/or storing. For example, the server 202 can store data corresponding to handshake exchanges 242 in a server database (e.g., memory 217). In some embodiments, the server 202 can store IPv4 data 218, IPv6 data 220, device identifiers 222, metadata clusters 224, metadata, and/or handshake data 242. The server 202 can store and organize the data based by device 240, by a handshake exchange 242, and/or by the type of data (e.g., IPv4 data 218, IPv6 data 220, device identifiers 222, metadata clusters 224, metadata, handshake data 242).

Referring now to operation (315), and in some embodiments, a first handshake exchange 242 can be received. For example, the server 202 can receive, from a monitoring agent 206 injected at a first device 240 of the plurality of devices 240, a first handshake exchange 242. The first handshake exchange 242 can include a first device identifier 222 corresponding to the first device 240, and a first internet protocol (IP) address for the first device 240. The first IP address 218 for the first device 240 can correspond to a first address type 218 or a IPv4 address 218 for the first device 240. In some embodiments, the handshake exchange 242 can correspond to communication sequence between the first device 240 and the server 202. For example, the device 240 can communicate with the server 202 to identify the device 240. The handshake exchange 242 can include a multi-stage sequence (e.g., two-stage sequence) using data such as, but not limited to, one or more host names (e.g., domain name system (DNS) host names), such that the server 202 can identify the device 240 initiating the handshake exchange 242. In some embodiments, the monitoring agent 206 executing at the device 240 can initiate the handshake exchange 242 and communicate with the server 202 to identify the device 240. The monitoring agent 206 can be executing at the first device 240, for example, within a browser of the first device 240. The monitoring agent 206 can collect the data from the first handshake exchange 242, such as, but not limited to, the first device identifier 222 and/or the first IP address 218 for the first device 240. The monitoring agent 206 can transmit the data from the first handshake exchange 242 to the server 202.

In some embodiments, the server 202 can receive a first handshake exchange 242 from at least one device 240. For example, a device 240 can initiate a handshake exchange 242 with the server 202. In some embodiments, the server 202 can detect a handshake exchange 242 between devices 240, between a device 240 and the server 202, and/or between a device 240 and a different endpoint or server within the network 255. The server 202 can collect or extract data from the first handshake exchange 242, such as, but not limited to, the first device identifier 222 and/or the first IP address 218 for the first device 240. The server 202 can extract data such as, but not limited to, DNS host names and/or performance metrics corresponding to the respective device 240.

Referring now to operation (320), and in some embodiments, a second handshake exchange 242 can be received. For example, the server 202 can receive from the monitoring agent 206 injected at the first device 240 of the plurality of devices 240, a second handshake exchange 242. The second handshake exchange 242 can include the first device identifier 222 corresponding to the first device and a second IP address 220 for the first device 240. The second IP address 220 for the first device 240 can correspond to a second address type or a IPv6 address for the first device 240. In some embodiments, the monitoring agent 206 executing at the device 240 can initiate the second handshake exchange 242 and communicate with the server 202 to identify the device 240. The monitoring agent 206 can collect the data from the second handshake exchange 242, such as, but not limited to, the first device identifier 222 and/or the second IP address 220 for the first device 240. In some embodiments, the second handshake exchange 242 can include a first IP address 218 of the first type for the device 240 and a second IP address 220 of the second type for the device 240. The monitoring agent 206 can transmit the data from the second handshake exchange 242 to the server 202.

In some embodiments, the server 202 can receive the second handshake exchange 242 from at least one device 240. The server 202 can collect or extract data from the second handshake exchange 242, such as, but not limited to, the first device identifier 222, DNS host names, the first IP address 218 for the first device 240, and/or the second IP address 220 for the first device 240. The first and second handshake exchanges 242 can each include the device identifier 222. In some embodiments, the device identifier 222 can correspond to a globally unique identifier (GUID) or a globally unique session identifier associated with a connection 250 (e.g., measurement session) initiated at the device 240. The server 202 can use the device identifier 222 to identify the respective device 240 that initiated or is otherwise included in the handshake exchange 242. In some embodiments, the first handshake exchange 242 can include a first host name and the second handshake exchange 242 can include a second host name different from the first host name. Thus, the first and second handshake exchanges 242 can include different or separate host names for the respective device 240 to identify itself to the server 202. The server 202 can compare the data from the first handshake exchange 242 to the data from the second handshake exchange 242 to extract or determine the device identifier 222 for the device 240 initiating the first and second handshake exchanges 242.

In some embodiments, the server 202 can perform a lookup (e.g., DNS resolve, DNS lookup) using the data from the handshake exchanges 242 to resolve at least one host name provided in a handshake exchange 242 to an IP address corresponding to the device 240. The server 202 can determine if the handshake exchanges 242 include one or more IP addresses 218 of a first type, one or more IP addresses 220 of a second type, or both IP addresses 218, 220 of a first and second type. For example, the server 202 can determine if the device 240 supports IPv4, IPv6, or both IPv4 and IPv6 based in part on the data from the first and/or second handshake exchanges 242. The server 202 can determine a type of record for a host or device 240 initiating the handshake exchange 242. In some embodiments, to determine a type of address, the server 202 can determine if the first handshake exchange 242 includes or corresponds to an A record (e.g., first type of record) and thus, corresponds to a first type of address or a IPv4 address for the host or device 240. The server 202 can determine if the second handshake exchange 242 includes or corresponds to an AAA record (e.g., second type of record) and thus, corresponds to a second type of address or a IPv6 address for the host or device 240. The server 2020 can determine if the device 240 includes or has an IPv4 address, an IPv6 address, or both an IPv4 address and an IPv6 address. Thus, based in part on a type of record for the host or device 240, the server 202 can determine if the device 240 supports IPv4, IPv6, or both IPv4 and IPv6. The server 2020 can determine if the device 240 can support an IPv4 connection, an IPv6 connection, or both an IPv4 connection and an IPv6 connection (e.g., dual stack connection).

Referring now to operation (325), and in some embodiments, an association 210 can be determined. In embodiments, the server 202 can determine an association 210 between the first address type 218 and the second address type 220 based at least on a predetermined number of higher order bits 266 common to the first IP address 218 and the second IP address 220 for the first device 240. For example, the association 210 can correspond to a relationship between different IP addresses corresponding to the same device 240, group of devices 240, or cluster of devices 240. The association 210 can include a relationship between IP addresses of different types (e.g., IPv4 address, IPv6 address) corresponding to the same device 240, group of devices 240, or cluster of devices 240.

The server 202 can determine the association 210 based in part on address assignment structure and/or common clustering of metadata for neighboring or nearby-addresses, and/or the hierarchical nature of IP addresses in both the IPv4 space and the IPv6 space. For example, a device 240 (or an organization the device 240 is part of, a group of devices 240, or cluster of devices 240) can be assigned or allocated ownership of address spaces or address blocks having a range or plurality of IP addresses. The address spaces can be allocated to the respective device 240 hierarchically, for example, according to bit significance. A device 240 can be assigned or allocated an address space with a particular value of or a predetermined number of high order bits 266. The predetermined number of high-order bits 266 can vary. For example, the number of predetermined number of high-order bits 266 can correspond to or be equal to the number of bits in an owned IP space 262 for a particular device 240 or a total number of bits in the owned IP space 262 for a particular device 240. The high order bits 266, as used herein, can refer to an owned IP space 262 of the respective device 240. For example, IP addresses starting with the predetermined number of high order bits 266 can indicate that the IP addresses correspond to the same device 240 or organization. A main device 240 of an organization can control how it allocates the low order bits 268 to a device 240 or devices 240 of the same organization such that each of the devices 240 of the same organization can share the predetermined number of high order bits 266 and differ with respect to their low order bits 268. The high order bits 266 can correspond to the owned IP space 262 and the low order bits 268 can correspond to the assigned IP space 264.

The server 202 can compare the high order bits 266 from the first IP address 218 of the first type to the high order bits 266 from the second IP address 220 of the second type to determine that the first and second IP addresses 218, 220 correspond to the same device 240 or same organization. The server 202 can generate a first range 214 of IP addresses of the first type for the first device using the first IP address 218. The first range 214 of IP addresses can include the first IP address 218. For example, the server 202 can identify IP addresses of the first type having the same high order bits 266 as the first IP address 218. The server 202 can group the IP addresses of the first type having the same high order bits 266 as the first IP address 218 in a first range 214 of IP addresses.

In some embodiments, the server 202 can identify IP addresses of the first type having a predetermined number of high order bits 266 in common with the high order bits of the first IP address 218. The predetermined number of high order bits 266 in common can vary and be selected based on part on the total number of high order bits 266 corresponding to the owned IP space 262 for the first device 240. For example, the predetermined number of high order bits 266 in common can include a number of bit(s) less than the total number of high order bits 266 for the owned IP space 262 of the first device 240. In some embodiments, the predetermined number of high order bits 266 in common can include one bit less than the total number of high order bits 266 for the owned IP space 262 of the first device 240. The predetermined number of high order bits 266 in common can include two or more bits less than the total number of high order bits 266 for the owned IP space 262 of the first device 240. The server 202 can group IP addresses of the first type having a predetermined number of high order bits 266 in common with the high order bits of the first IP address 218 in a first range 214 of IP addresses. Thus, IP addresses of the first type grouped in the same range of IP addresses can include the same high order bits 266 or have a predetermined number of high order bits 266 in common with each other.

The server 202 can generate a second range 214 of IP addresses of the second type 220 for the first device 240 using the second IP address 220. The second range 214 of IP addresses can include the second IP address 220. For example, the server 202 can identify IP addresses of the second type having the same high order bits 266 as the second IP address 220. The server 202 can group the IP addresses of the second type having the same high order bits 266 as the second IP address 220 in a second range 214 of IP addresses.

In some embodiments, the server 202 can identify IP addresses of the second type having a predetermined number of high order bits 266 in common with the high order bits of the second IP address 220. The predetermined number of high order bits 266 in common can vary and be selected based on part on the total number of high order bits 266 corresponding to the owned IP space 262 for the second device 240. For example, the predetermined number of high order bits 266 in common can include a number of bit(s) less than the total number of high order bits 266 for the owned IP space 262 of the second device 240. In some embodiments, the predetermined number of high order bits 266 in common can include one bit less than the total number of high order bits 266 for the owned IP space 262 of the second device 240. The predetermined number of high order bits 266 in common can include two or more bits less than the total number of high order bits 266 for the owned IP space 262 of the second device 240. The server 202 can group IP addresses of the second type having a predetermined number of high order bits 266 in common with the high order bits of the second IP address 220 in a second range 214 of IP addresses. Thus, IP addresses of the second type grouped in the same range of IP addresses can include the same high order bits 266 or have a predetermined number of high order bits 266 in common with each other.

Referring now to operation (330), and in some embodiments, a first mapping 212 can be generated. For example, the server 202 can generate a first mapping 212 of a first range 214 of IP addresses of the first address type to a first range 214 of IP addresses of the second address type based on the association between the first IP address 218 and the second IP address 220 for the first device 240. The first range 214 of IP addresses can include the first IP address 218 for the first device 240 and the second range 214 of IP addresses can include the second IP address 220 for the first device 240.

In embodiments, the server can map a range 214 of IP addresses of the first type 218 to a range 214 of IP addresses of the second type 220 based in part on the addresses being associated with or corresponding to the same device 240. For example, the server 202 can map a range 214 of IPv4 address 218 corresponding to the first device 240 to a range 214 of IPv6 addresses 220 corresponding to the first device 240. Thus, when the server 202 receives a handshake exchange including an IPv4 address 218, the server 202 can identify a corresponding IPv6 address 220 using the mapping 212. When the server 202 receives a handshake exchange including an IPv6 address 220, the server 202 can identify a corresponding IPv4 address 218 using the mapping 212.

In some embodiments, the mappings 212 can include distributed data sets associating known pairs of public IPv4 addresses and IPv6 addresses. The mappings 212 can include distributed data sets associating IPv4 addresses for a device 240 (or organization, group of devices 240, cluster of devices 240) and IPv6 addresses for the same device 240 (or same organization, same group of devices 240, same cluster of devices 240). The server 202 can map ranges 214 of IP addresses of different types of addresses with each other that correspond to the same device 240, group of devices 240, and/or cluster of devices 240.

Referring now to operation (335), and in some embodiments, IP ranges 214 can be assigned to a first metadata cluster 224. For example, the server 202 can assign the first range 214 of IP addresses of the first address type 218 and the second range 214 of IP addresses of the second address type 220 to a first metadata cluster 224 for the first device 240. The first metadata cluster 224 can include metadata 226 corresponding to the first device 240. The first metadata cluster 224 can include geographical properties of the first device 240 and/or performance data (e.g., performance metrics) of the first device 240.

The server 202 can determine metadata 226 for different devices 240 based in part on the mappings 212 between IP addresses of different types. For example, the mappings 212 can indicate that devices 240 having IP addresses within the same ranges 214 can have the same or common metadata 226, such as geographical properties. The server 202 can generate a metadata cluster 224 based in part on metadata 226 of devices 240 identified to be within a particular mapping 212. For example, if the first device 240 can be identified within a particular mapping 212, the metadata 226 corresponding to the first device 240 can be used to generate the first metadata cluster 224. Other devices 240 (e.g., different from the first device 240) identified to be included within the same mapping 212 as the first device 240 can have the same or common metadata 226. Thus, the metadata 226 for the other devices 240 can be determined based in part on the metadata 226 of the first device 240. The server 202 can use the first metadata cluster The server 202, responsive to mapping the first range 214 of IP addresses of the first address type 218 to the second range 214 of IP addresses of the second address type 220, can collect or extract metadata 226 corresponding to the first device 240. The server 202 can use the collected metadata 226 to generate the first metadata cluster 224 corresponding to the first device 240. The metadata cluster 224 can be used to determine metadata 226 for devices 240 having an IP address of the first type within the first range 214 of the IP addresses and/or an IP address of the second type within the second range 214 of IP addresses. For example, devices 240 within the same group or organization as the first device 240 can share metadata 226 such as but not limited to, geographical properties. In some embodiments, the server 202 can determine geographical properties for a device 240 such as, but not limited to, a country, a region, a state and/or a city where the respective device 240 possessing an IP address within the first range 214 or second range 214 of IP addresses is located. In some embodiments, the server 202 can determine metadata 226 including performance properties for a device 240. The performance properties can include, but not limited to, bandwidth properties, memory usage, memory allocation, central processing unit (CPU) usage, and/or latency properties.

Referring now to operation (340), and in some embodiments, a third handshake exchange 242 can be received. For example, the server 202 can receive a third handshake exchange 242. The third handshake exchange 242 can include a second device identifier 222 corresponding to a second device 240 of the plurality of devices 240. The third handshake exchange 242 can include a first IP address 218 for the second device 240. The first IP address 218 for the second device 240 can correspond to the first address type. In some embodiments, the server 202 can receive, from a monitoring agent 206 provided to or injected at the second device 240, the third handshake exchange 242.

The third handshake exchange 242 can include a multi-stage sequence (e.g., two-stage sequence) using data such as, but not limited to, one or more host names (e.g., domain name system (DNS) host names), such that the server 202 can identify the device 240 initiating the third handshake exchange 242. In some embodiments, the monitoring agent 206 executing at the second device 240 can initiate the handshake exchange 242 and communicate with the server 202 to identify the second device 240. The monitoring agent 206 can be executing within a browser of the second device 240. The monitoring agent 206 can collect the data from the third handshake exchange 242, such as, but not limited to, the second device identifier 222 and/or the first IP address 218 for the second device 240. The monitoring agent 206 can transmit the data from the third handshake exchange 242 to the server 202.

In some embodiments, the second device 240 can initiate the third handshake exchange 242 with the server 202. In some embodiments, the server 202 can detect the third handshake exchange 242 between devices 240, between a device 240 and the server 202, and/or between a device 240 and a different endpoint or server within the network 255. The server 202 can collect or extract data from the third handshake exchange 242, such as, but not limited to, the second device identifier 222 and/or the first IP address for the second device 240. The server 202 can extract data such as, but not limited to, DNS host names and/or performance metrics corresponding to the respective device 240.

Referring now to operation (345), and in some embodiments, a fourth handshake exchange 242 can be received. For example, the server 202 can receive a fourth handshake exchange 242. The fourth handshake exchange 242 can include the second device identifier 222 corresponding to the second device 240 of the plurality of devices 240. The fourth handshake exchange 242 can include a second IP address 220 for the second device 240. The second IP address 220 for the second device 240 can correspond to the second address type.

In some embodiments, the server 202 can receive from a monitoring agent 206 provided to or injected at the second device 240, a fourth handshake exchange 242. The monitoring agent 206 executing at the second device 240 can initiate the fourth handshake exchange 242 and communicate with the server 202 to identify the second device 240. The monitoring agent 206 can collect the data from the fourth handshake exchange 242, such as, but not limited to, the second device identifier 222 and/or the second IP address 220 for the second device 240. In some embodiments, the fourth handshake exchange 242 can include a first IP address 218 of the first type for the second device 240 and a second IP address 220 of the second type for the second device 240. The monitoring agent 206 can transmit the data from the fourth handshake exchange 242 to the server 202.

In some embodiments, the server 202 can receive the fourth handshake exchange 242 from the second device 240. The server 202 can collect or extract data from the fourth handshake exchange 242, such as, but not limited to, the second device identifier 222, DNS host names, the first IP address 218 for the second device 240, and/or the second IP address 220 for the second device 240. In some embodiments, the third handshake exchange 242 can include a first host name corresponding to the second device 240 and the fourth handshake exchange 242 can include a second host name, different from the first host name, corresponding to the second device 240. The server 202 can use the different host names provided in the third and fourth handshake exchanges 242 to identify the second device 240. For example, the server 202 can compare the data from the third handshake exchange 242 to the data from the fourth handshake exchange 242 to extract or determine the second device identifier 222 for the second device 240 initiating the third and fourth handshake exchanges 242.

In some embodiments, the server 202 can perform a lookup (e.g., DNS resolve, DNS lookup) using the data from the handshake exchanges 242 to resolve at least one host name provided in the third and fourth handshake exchanges 242 to an IP address corresponding to the second device 240. The server 202 can determine if the third and fourth handshake exchanges 242 include one or more IP addresses 218 of a first type, one or more IP addresses 220 of a second type, or both IP addresses 218, 220 of a first and second type corresponding to the second device 240. For example, the server 202 can determine if the second device 240 supports IPv4, IPv6, or both IPv4 and IPv6 based in part on the data from the third and/or fourth handshake exchanges 242.

In some embodiments, the server 202 can determine an association between the first address type 218 and the second address type 220 using the first IP address and the second IP address for the second device 240. For example, the server 202 can determine an association 210 between the first address type 218 and the second address type 220 for the second device 240 based at least on a predetermined number of higher order bits 266 common to the first IP address 218 and the second IP address 220 for the second device 240. The server 202 can compare the high order bits 266 from the first IP address 218 of the first type to the high order bits 266 from the second IP address 220 of the second type to determine that the first and second IP addresses 218, 220 both correspond to the second device 240 or same organization. The server 202 can generate a first range 214 of IP addresses of the first type for the second device 240 using the first IP address 218. The first range 214 of IP addresses can include the first IP address 218 for the second device 240. For example, the server 202 can identify IP addresses of the first type having the same high order bits 266 as the first IP address 218 of the second device 240. The server 202 can group the IP addresses of the first type having the same high order bits 266 as the first IP address 218 in a first range 214 of IP addresses.

In some embodiments, the server 202 can identify IP addresses of the first type having a predetermined number of high order bits 266 in common with the high order bits of the first IP address 218 of the second device 240. The predetermined number of high order bits 266 in common can include a number of bit(s) less than the total number of high order bits 266 for the owned IP space 262 of the second device 240. In some embodiments, the predetermined number of high order bits 266 in common can include one bit less than the total number of high order bits 266 for the owned IP space 262 of the second device 240. The predetermined number of high order bits 266 in common can include two or more bits less than the total number of high order bits 266 for the owned IP space 262 of the second device 240. The server 202 can group IP addresses of the first type having a predetermined number of high order bits 266 in common with the high order bits 266 of the first IP address 218 in a first range 214 of IP addresses.

The server 202 can generate a second range 214 of IP addresses of the second type 220 for the second device 240 using the second IP address 220. The second range 214 of IP addresses can include the second IP address 220. The server 202 can identify IP addresses of the second type having the same high order bits 266 as the second IP address 220 of the second device 240. The server 202 can group the IP addresses of the second type having the same high order bits 266 as the second IP address 220 in a second range 214 of IP addresses corresponding to the second device 240.

In some embodiments, the server 202 can identify IP addresses of the second type having a predetermined number of high order bits 266 in common with the high order bits of the second IP address 220 of the second device 240. The predetermined number of high order bits 266 in common can include a number of bit(s) less than the total number of high order bits 266 for the owned IP space 262 of the second device 240. In some embodiments, the predetermined number of high order bits 266 in common can include one bit less than the total number of high order bits 266 for the owned IP space 262 of the second device 240. The predetermined number of high order bits 266 in common can include two or more bits less than the total number of high order bits 266 for the owned IP space 262 of the second device 240. The server 202 can group IP addresses of the second type having a predetermined number of high order bits 266 in common with the high order bits of the second IP address 220 in a second range 214 of IP addresses.

Referring now to operation (350), and in some embodiments, a second mapping can be generated. For example, the server 202 can generate a second mapping 212 of a second range 214 of IP addresses of the first address type 218 to a second range 214 of IP addresses of the second address type 220 based on the association between the first IP address 218 and the second IP address 220 of the second device 240. The second range 214 of IP addresses can include the first IP address 218 for the second device 240 and the second range 214 of IP addresses can include the second IP address 220 for the second device 240.

The server can map a second range 214 of IP addresses of the first type 218 to a second range 214 of IP addresses of the second type 220 based in part on the addresses being associated with or corresponding to the second device 240. In some embodiments, the server 202 can map a range 214 of IPv4 address 218 corresponding to the second device 240 to a range 214 of IPv6 addresses 220 corresponding to the second device 240. The second mapping 212 can include data sets associating known pairs of public IPv4 addresses and IPv6 addresses. The second mapping 212 can include distributed data sets associating IPv4 addresses for the second device 240 (or organization, group of devices 240, cluster of devices 240) and IPv6 addresses for the second device 240 (or same organization, same group of devices 240, same cluster of devices 240).

Referring now to operation (355), and in some embodiments, IP ranges 214 can be assigned to a second metadata cluster 224. For example, the server 202 can assign the second range 214 of IP addresses of the first address type 218 and the second range of IP addresses of the second address type 220 to a second metadata cluster 224 for the second device 240. The second metadata cluster 224 can include geographical properties of the second device 240 and/or performance properties of the second device 240. The second metadata cluster 224 can include metadata 226 corresponding to the second device 240.

In embodiments, the server 202 can generate the second metadata cluster 224 based in part on metadata 226 of devices 240 identified to be within the same mapping 212 as the second device 240. In some embodiments, if the second device 240 can be identified within a particular mapping 212, the metadata 226 corresponding to the second device 240 can be used to generate the second metadata cluster 224. Metadata for other devices 240 (e.g., different from the second device 240) identified to be included within the same mapping 212 as the second device 240 can be determined based in part on the metadata 226 of the second device 240.

In some embodiments, the server 202, responsive to mapping the first range 214 of IP addresses of the first address type 218 to the second range 214 of IP addresses of the second address type 220, can collect or extract metadata 226 corresponding to the second device 240. The server 202 can use the collected metadata 226 to generate the second metadata cluster 224 corresponding to the second device 240. The metadata cluster 224 can be used to determine metadata 226 for devices 240 having an IP address of the first type within the first range 214 of the IP addresses and/or an IP address of the second type within the second range 214 of IP addresses for the second device 240. For example, devices 240 within the same group or organization as the second device 240 can share metadata 226 such as but not limited to, geographical properties. In some embodiments, the server 202 can determine geographical properties for a device 240 such as, but not limited to, a country, a region, a state and/or a city where the respective device 240 possessing an IP address within the first range 214 or second range 214 of IP addresses is located. In some embodiments, the server 202 can determine metadata 226 including performance properties for a device 240. The performance properties can include, but not limited to, bandwidth properties, memory usage, memory allocation, central processing unit (CPU) usage, and/or latency properties.

Referring now to operation (360), and in some embodiments, an IP address can be determined for a device 240. For example, in some embodiments, the server 202 can receive a handshake exchange 242 that includes a device identifier 222 corresponding to a device 240 different from the first device 240 (e.g., second device 240). The handshake exchange 242 can include an IP address of the first type 218 for the device 240, an IP address of the second type 220 for the device 240 or both an IP address of the first type 218 and an IP address of the second type 220. The server 202 can determine that the IP address of the first type 218 for the device 240 is within or falls within the first range of IP addresses of the first address type 218 for the first device. The server 202 can determine that the IP address of the second type 220 for the device 240 is within or falls within the second range of IP addresses of the second address type 220 for the first device 240.

The server 202 can use the first mapping 212 generated for the first device 240 to determine a second IP address for the first device 240. The mapping 212 can associate IP addresses of the first type 218 to IP addresses of the second type 220 and associate IP addresses of the second type 220 to IP addresses of the first type 218. In embodiments, the mapping 212 can include an IP address of the first type 218 and a corresponding IP address of the second type 220. The mapping 212 can include two or more IP addresses of the first type 218 and a corresponding two or more IP address of the second type 220. In some embodiments, the mapping 212 can link an IPv4 address 218 (or multiple IPv4 addresses) with a corresponding IPv6 address 220 (or multiple IPv6 addresses) for a device 240 or cluster of devices 240. Thus, by determining that a device 240 corresponds to a generated mapping 212, the server 202 can determine an IPv4 address 218 for a device 240 or an IPv6 address 220 for a device 240. For example, if the handshake exchange included an IP address of the first type 218 (e.g., IPv4 address) for the device 240, the server 202 can use the first mapping 212 to determine an IP address of the second type 220 (e.g., IPv6 address) for the device 240. If the handshake exchange included an IP address of the second type 220 (e.g., IPv6 address) for the device 240, the server 202 can use the first mapping 212 to determine an IP address of the first type 218 (e.g., IPv4 address) for the device 240.

Referring now to operation (365), and in some embodiments, metadata 226 can be determined for a device 240. The server 202 can determine metadata 226 for a device 240 using the first mapping 212, the first range 214 of IP addresses 218, and/or the second range 214 of IP addresses of the second type 220. The server 202 can use generated metadata clusters 224 to determine metadata 226 for subsequent devices 240, IP addresses of the first type 218, and/or IP addresses of the second type 220 associated with subsequent handshake exchanges 242. For example, the server 202 can receive a handshake exchange 242 including a device identifier 222 and an IP address corresponding to the device 240. The server can determine that the IP address is included within or falls within the first range 214 of IP addresses of the first type 218 corresponding to the first device 240 and/or that the IP address is included within or falls within the second range 214 of IP addresses of the second type 220 corresponding to the first device 240. Thus, the device 240 can include or have metadata 226 in common with the first device 240 and the server 202 can use the metadata 226 from the first device 240 to identify properties of the device 240 that transmitted the handshake exchange 242. For example, the server can identify the first metadata cluster 224 that the first device 240 is assigned to and extract the metadata 226 from the first metadata cluster 224. The server 202 can correlate or associate the metadata 226 from the first metadata cluster 224 to the device 240 that generated the handshake exchange 242. In some embodiments, the server 202 can generate metadata 226 for the device 240 using the metadata 226 from the first metadata cluster 224. The server 202 can determine, using the first metadata cluster 224 for the first device 240, a geographical location of the device 240. The geographical location may include a country, a region, a state and/or a city where a particular device 240 is located.

In embodiments, the server 202 can use the mappings 212 to assign IP addresses (e.g., newly received IP addresses, unknown IP addresses) into associations 210 and/or metadata clusters 224 for determining the metadata 226 for the previously unknown IP addresses. For example, if a first mapping 212 includes two IP addresses that differ by a single bit in the IPv6 range 214 of the mapping 212, the server 202 can assign subsequent IP addresses that fall within the IPv6 range 214 to the corresponding IPv4 address range 214 of the mapping. Thus, metadata 226 associated with the known IPv6 addresses 220 of the IPv6 address range 214 can be associated with IPv4 addresses 218 of the corresponding IPv4 address range 214 of the mapping 212. For example, and in one embodiment, if a first IPv4 address 218 in the IPv4 range 214 associated with the IPv6 address range 214 has a known location of Boston, Mass. then IPv6 addresses of the IPv6 range 214 associated with the IPv4 range 214, and varying by the single bit in the IPv6 address range 214, can be determined to be located within Boston, Mass.

In embodiments, if a first mapping 212 includes two IP addresses that differ by a single bit in the IPv4 range 214 of the mapping 212, the server 202 can assign subsequent IP addresses that fall within the IPv4 range 214 to the corresponding IPv6 address range 214 of the mapping. Metadata 226 associated with the known IPv4 addresses 218 of the IPv4 address range 214 can be associated with IPv6 addresses 220 of the corresponding IPv6 address range 214 of the mapping 212. For example, and in one embodiment, if a first IPv6 address 220 in the IPv6 range 214 associated with the IPv4 address range 214 has a known location of London, England then IPv4 addresses 218 of the IPv4 range 214 associated with the IPv6 range 214, and varying by the single bit in the IPv4 address range 214, can be determined to be located within London, England.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method of cross protocol association for internet addresses, the method comprising:
    (a) receiving, by a server from a monitoring agent executing at a first device of a plurality of devices, a first handshake exchange, the first handshake exchange including a first device identifier corresponding to the first device, and a first internet protocol (IP) address for the first device, the first IP address for the first device corresponding to a first address type;
    (b) receiving, by the server, from the monitoring agent, a second handshake exchange, the second handshake exchange including the first device identifier corresponding to the first device, and a second IP address for the first device, the second IP address for the first device corresponding to a second address type;
    (c) determining, by the server, an association between the first address type and the second address type responsive to a comparison of a same number of higher order bits of the first IP address and the second IP address for the first device;
    (d) generating, by the server, a first mapping of a first range of IP addresses of the first address type to a first range of IP addresses of the second address type based on the association between the first IP address and the second IP address for the first device, the first range of IP addresses of the first address type including the first IP address for the first device and the first range of IP addresses of the second address type including the second IP address for the first device;
    (e) assigning, by the server, the first range of IP addresses of the first address type and the first range of IP addresses of the second address type to a first metadata cluster for the first device, the first metadata cluster including geographical properties of the first device; and
    (f) determining, by the server, a boundary between owned address space for the first range of IP addresses of the first address type and assigned address space for the first range of IP addresses of the first address type, wherein the owned address space corresponds to the same number of higher order bits common to the first IP address and the second IP address for the first device.

2. The method of claim 1, wherein the first address type corresponds to an internet protocol version 4 (IPv4) address and the second address type corresponds to an internet protocol version 6 (IPv6) address.

3. The method of claim 1, further comprising monitoring, by the server through a plurality of monitoring agents, a plurality of handshake exchanges between the plurality of devices and the server, the plurality of handshake exchanges including at least one device identifier, and each device identifier corresponding to at least one device of the plurality of devices.

4. The method of claim 1, further comprising:
receiving, by the server, a third handshake exchange, the third handshake exchange including a second device identifier corresponding to a second device of the plurality of devices and a first IP address for the second device, the first IP address for the second device corresponding to the first address type;
receiving, by the server, a fourth handshake exchange, the fourth handshake exchange including the second device identifier corresponding to the second device of the plurality of devices, and a second IP address for the second device, the second IP address for the second device corresponding to the second address type; and
determining, by the server, an association between the first address type and the second address type using the first IP address for the second device and the second IP address for the second device.

5. The method of claim 4, further comprising:
generating, by the server, a second mapping of a second range of IP addresses of the first address type to a second range of IP addresses of the second address type based on the association between the first IP address and the second IP address of the second device, the second range of IP addresses of the first address type including the first IP address for the second device and the second range of IP addresses of the second address type including the second IP address for the second device; and
assigning, by the server, the second range of IP addresses of the first address type and the second range of IP addresses of the second address type to a second metadata cluster for the second device, the second metadata cluster including geographical properties of the first device.

6. The method of claim 5, further comprising:
receiving, by the server, a fifth handshake exchange, the fifth handshake exchange including a third device identifier corresponding to a third device of the plurality of devices, and a first IP address for the third device, the first IP address for the third device corresponding to the first address type;
determining, by the server, the first IP address for the third device is positioned between the first range of IP addresses of the first type and the second range of IP addresses of the first type; and
determining, by the server, a second IP address for the third device using the first mapping and the second mapping, the second IP address of the second address type.

7. The method of claim 1, further comprising;
receiving, by the server, a third handshake exchange, the third handshake exchange including a second device identifier corresponding to a second device of the plurality of devices, and a first IP address for the second device, the first IP address for the second device within the first range of IP addresses of the first address type; and
determining, by the server using the first mapping and the first range of IP addresses of the first address type, the second device corresponds to the first metadata cluster for the first device; and
generating, by the server, metadata for the second device using the first metadata cluster.

8. The method of claim 7, further comprising:
determining, by the server using the first metadata cluster for the first device, a geographical location of the second device.

9. The method of claim 1, further comprising;
receiving, by the server, a third handshake exchange, the third handshake exchange including a second device identifier corresponding to a second device of the plurality of devices, and a first IP address for the second device, the first IP address for the second device within the first range of IP addresses of the first address type; and determining, by the server using the first mapping, a second IP address for the second device, the second IP address of the second address type.

10. The method of claim 1, further comprising:

determining the owned address space for the first range of IP addresses of the first address type corresponds to a cluster of devices including the first device, wherein each device in the cluster of devices includes an IP address sharing the same number of higher order bits.

11. The method of claim 10, further comprising:

identifying, by the server, a third handshake exchange including a third device identifier corresponding to a third device of the plurality of devices and a first IP address for the third device;

determining, by the server, the first IP address for the third device corresponds to the owned address space for the first range of IP addresses of the first address type; and assigning, by the server, the third device to the cluster of devices with the first device.

12. A system for cross protocol association for internet addresses, the system comprising:

a server comprising one or more processors, coupled to a memory, and the server configured to:

receive, from a monitoring agent executing at a first device of a plurality of devices, a first handshake exchange, the first handshake exchange including a first device identifier corresponding to the first device, and a first internet protocol (IP) address for the first device, the first IP address for the first device corresponding to a first address type;

receive, from the monitoring agent, a second handshake exchange, the second handshake exchange including the first device identifier corresponding to the first device, and a second IP address for the first device, the second IP address for the first device corresponding to a second address type;

determine, an association between the first address type and the second address type responsive to a comparison of a same number of higher order bits of the first IP address and the second IP address for the first device;

generate a first mapping of a first range of IP addresses of the first address type to a first range of IP addresses of the second address type based on the association between the first IP address and the second IP address for the first device, the first range of IP addresses of the first address type including the first IP address for the first device and the first range of IP addresses of the second address type including the second IP address for the first device;

assign the first range of IP addresses of the first address type and the first range of IP addresses of the second address type to a first metadata cluster for the first device, the first metadata cluster including geographical properties of the first device; and determine a boundary between owned address space for the first range of IP addresses of the first address type and assigned address space for the first range of IP addresses of the first address type, wherein the owned address space corresponds to the same number of higher order bits common to the first IP address and the second IP address for the first device.

13. The system of claim 12, wherein the server is further configured to:

receive a third handshake exchange, the third handshake exchange including a second device identifier corresponding to a second device of the plurality of devices, and a first IP address for the second device, the first IP address for the second device corresponding to the first address type;

receive a fourth handshake exchange, the fourth handshake exchange including the second device identifier corresponding to the second device of the plurality of devices, and a second IP address for the second device, the second IP address for the second device corresponding to the second address type; and determine an association between the first address type and the second address type using the first IP address for the second device and the second IP address for the second device.

14. The system of claim 13, wherein the server is further configured to:

generate a second mapping linking a second range of IP addresses of the first address type to a second range of IP addresses of the second address type based on the association between the first IP address and the second IP address of the second device, the second range of IP addresses of the first address type including the first IP address for the second device and the second range of IP addresses of the second address type including the second IP address for the second device; and assign the second range of IP addresses of the first address type and the second range of IP addresses of the second address type to a second metadata cluster for the second device, the second metadata cluster including geographical properties of the first device.

15. The system of claim 14, wherein the server is further configured to:

receive a fifth handshake exchange, the fifth handshake exchange including a third device identifier corresponding to a third device of the plurality of devices, and a first IP address for the third device, the first IP address for the third device corresponding to the first address type;

determine the first IP address for the third device is positioned between the first range of IP addresses of the first type and the second range of IP addresses of the first type; and determine a second IP address for the third device using the first mapping and the second mapping, the second IP address of the second address type.

16. The system of claim 12, wherein the server is further configured to:

receive a third handshake exchange, the third handshake exchange including a second device identifier corresponding to a second device of the plurality of devices, and a first IP address for the second device, the first IP address for the second device within the first range of IP addresses of the first address type; and determine, using the first mapping and the first range of IP addresses of the first address type, the second device corresponds to the first metadata cluster for the first device; and generate metadata for the second device using the first metadata cluster.

17. The system of claim 16, wherein the server is further configured to:

determine, using the first metadata cluster for the first device, a geographical location of the second device.

18. The system of claim 12, wherein the server is further configured to:

receive a third handshake exchange, the third handshake exchange including a second device identifier corresponding to a second device of the plurality of devices, and a first IP address for the second device, the first IP address for the second device within the first range of IP addresses of the first address type; and determine, using the first mapping, a second IP address for the second device, the second IP address of the second address type.

19. The system of claim 12, wherein the server is further configured to:

determine the owned address space for the first range of IP addresses of the first address type corresponds to a cluster of devices including the first device, wherein each device in the cluster of devices includes an IP address sharing the same number of higher order bits.

20. The system of claim 19, wherein the server is further configured to:

identify a third handshake exchange including a third device identifier corresponding to a third device of the plurality of devices and a first IP address for the third device;

determine the first IP address for the third device corresponds to the assigned owned address space for the first range of IP addresses of the first address type; and assign the third device to the cluster of devices with the first device.

* * * * *